United States Patent [19]
Petot et al.

[11] Patent Number: 5,203,171
[45] Date of Patent: Apr. 20, 1993

[54] ROTARY ELECTROTHERMAL ACTUATOR

[75] Inventors: Bradford W. Petot, Cleveland Hts.; Douglas Herndon, Ashtabula, both of Ohio

[73] Assignee: Design & Manufacturing Corporation, Willoughby, Ohio

[21] Appl. No.: 767,630

[22] Filed: Sep. 30, 1991

[51] Int. Cl.⁵ .............................................. F03G 7/06
[52] U.S. Cl. .............................. 60/531; 92/31; 92/116
[58] Field of Search .............. 60/527, 528, 529, 530, 60/531; 92/31, 33, 116

[56] References Cited

U.S. PATENT DOCUMENTS

| | | | |
|---|---|---|---|
| 2,841,983 | 7/1958 | Vernet | 60/527 |
| 3,186,311 | 10/1962 | Carlson | 91/443 |
| 3,766,803 | 10/1973 | Ball, Jr. et al. | 60/527 X |
| 3,911,793 | 10/1975 | Izumi | 92/33 |
| 4,029,941 | 6/1977 | Heubscher et al. | 219/511 |
| 4,070,859 | 1/1978 | Sobecks | 60/530 |
| 4,070,946 | 1/1978 | Sandvik et al. | 91/25 |
| 4,079,589 | 3/1978 | Birli | 60/530 |
| 4,104,507 | 8/1978 | Tisone et al. | 219/513 |
| 4,504,038 | 3/1985 | King | 92/31 X |
| 4,711,156 | 12/1987 | Kayyod et al. | 92/31 |
| 4,711,157 | 12/1987 | Kayyod et al. | 92/31 |
| 4,759,189 | 7/1988 | Stropkay et al. | 60/531 |
| 4,887,429 | 12/1989 | Birli, Sr. et al. | 60/527 |

*Primary Examiner*—Allen M. Ostrager
*Attorney, Agent, or Firm*—Leydig, Voit & Mayer

[57] ABSTRACT

An electrothermal actuator for converting electrical energy to rotational mechanical motion includes a housing, a flexible diaphragm disposed in the housing and defining a boiler chamber within the housing, a working fluid disposed within the boiler chamber and changing phase in response to heating, thereby displacing the diaphragm, a heater disposed within the boiler chamber for heating the working fluid in response to an electrical current flowing through the heater, and a rotatable shaft assembly partially disposed within the housing and including a rotating shaft extending outside the housing, rotating between a return position and a rotated position, and a driver for rotating the shaft from the return position toward a rotated position in response to heating of the working fluid, displacing the diaphragm.

17 Claims, 4 Drawing Sheets

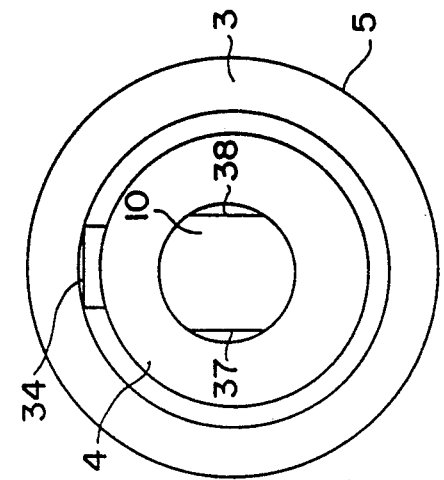
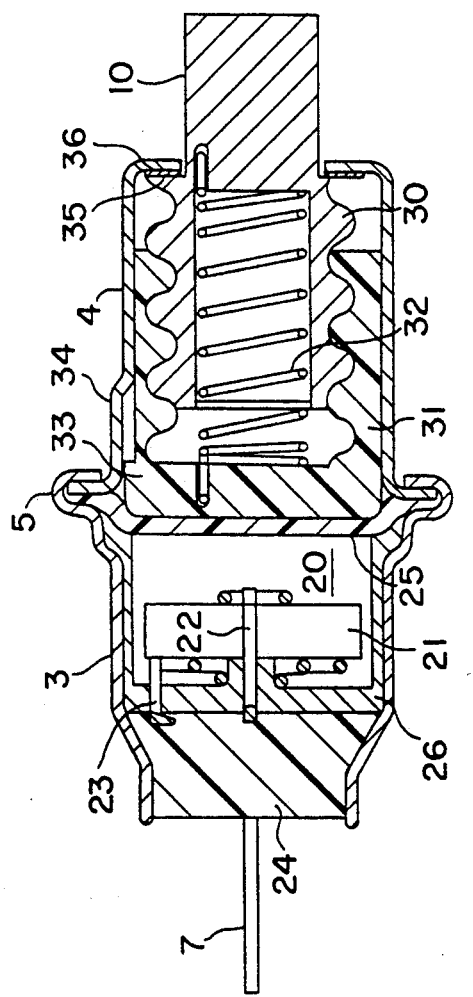
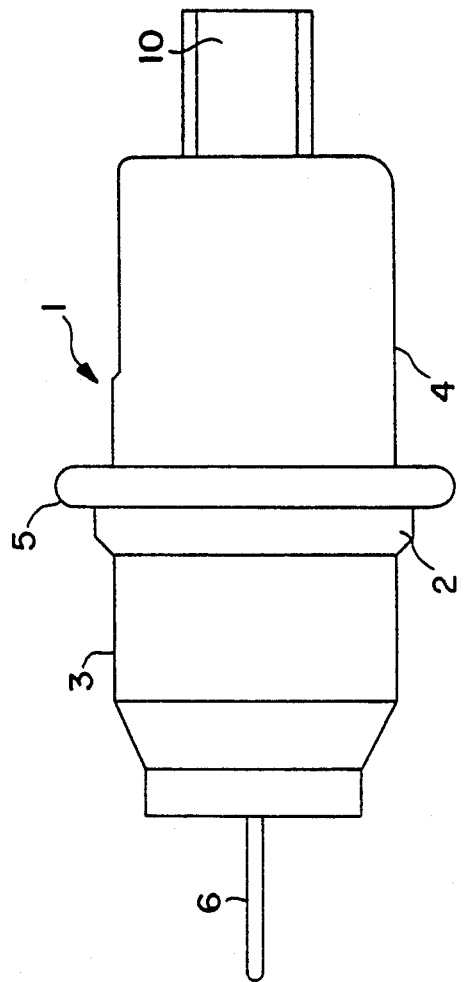
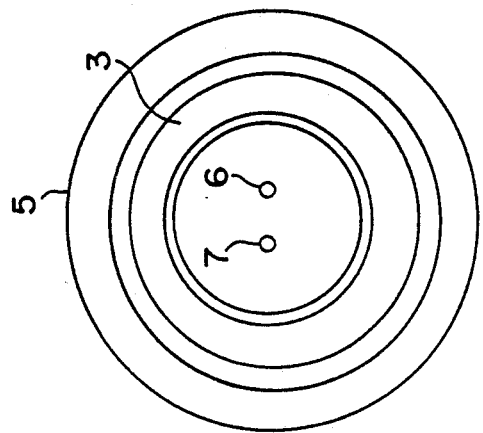

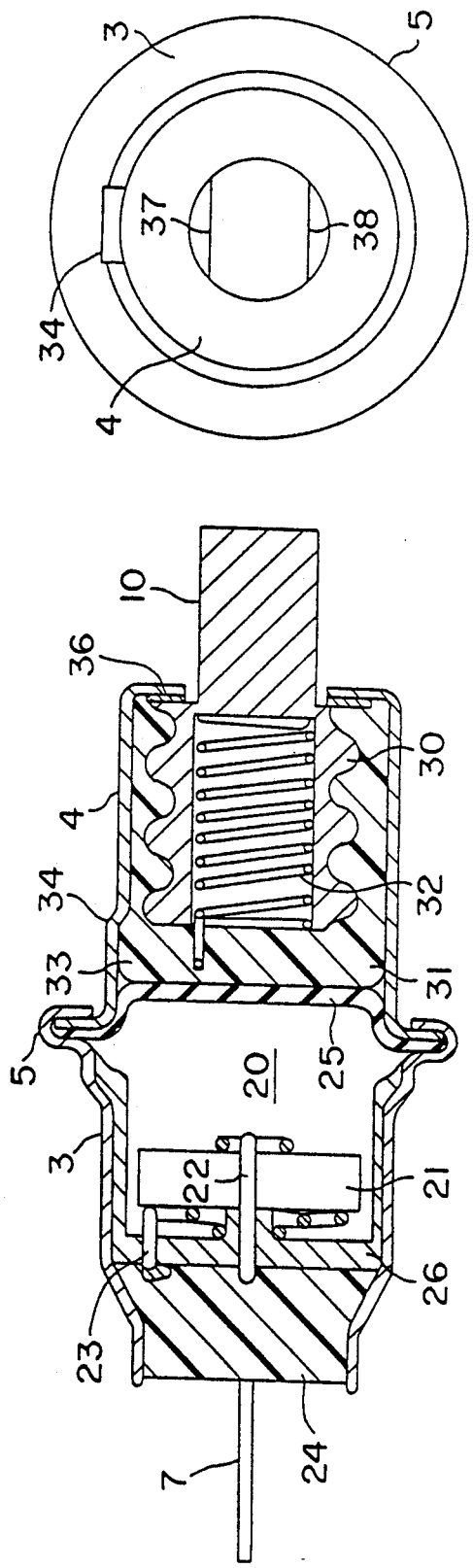
FIG. 3(a)
FIG. 3(b)
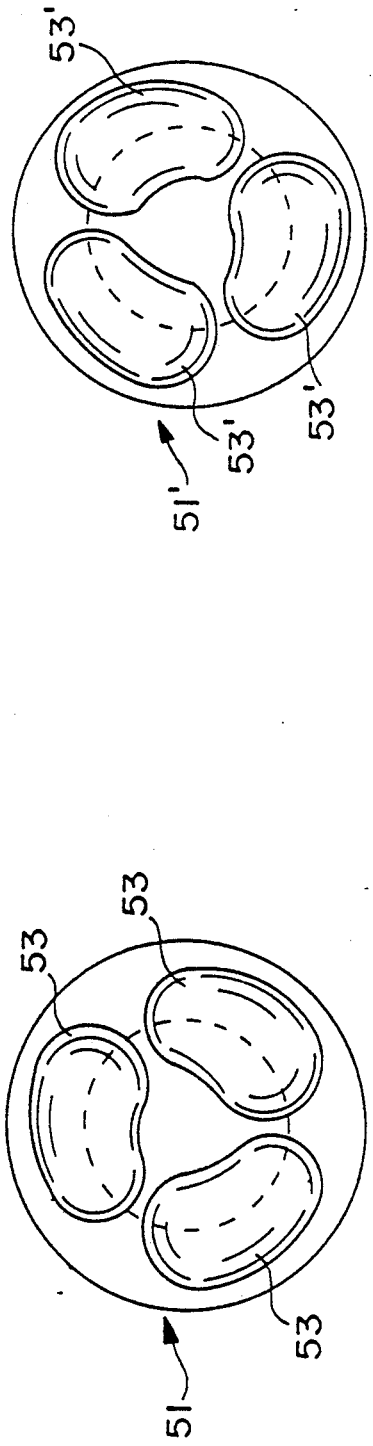
FIG. 7(a)
FIG. 7(b)

ROTARY ELECTROTHERMAL ACTUATOR

BACKGROUND

Electrothermal fluid displacement actuators that convert electrical energy into thermal energy and, in turn, employ the thermal energy to expand a thermally expandable fluid medium and produce linear motion are known. Examples of such actuators are described in commonly assigned U.S. Pat. Nos. 4,029,941 and 4,070,946, the disclosures of which are incorporated herein by reference. Additional examples of electrothermal actuators are disclosed in U.S. Pat. Nos. 4,070,859, 4,079,589, 4,104,507, 4,759,189, and 4,887,429, all commonly assigned.

In the electrothermal actuators described in the cited patents, a working fluid is contained within a boiler chamber in the actuator. Preferably, that fluid is a liquid at room temperature but, upon heating to a sufficient temperature, changes from a liquid phase to a gas phase. The phase transition results in an increasing pressure within the boiler chamber. The expanding working fluid presses against a diaphragm and displaces and/or expands the diaphragm to slide a piston within the actuator and a pin attached to the piston outwardly from the actuator. The out-stroking motion of the piston may be employed to actuate an external device. A return spring mounted within the actuator biases the piston to retract the pin when the pressure within the boiler chamber decreases. As long as the pressure of the working fluid is sufficient to overcome the biasing force of the return spring, the pin remains extended from the actuator. When the working fluid cools and returns to a liquid phase, the pressure on the diaphragm is reduced, the diaphragm contracts and/or retracts, and the piston and pin retract under the influence of the biasing force applied by the return spring.

In order to heat and produce a phase change in the working fluid, an electrically-driven heater is disposed within the boiler chamber The heater may be a simple resistance heater that produces heat in response to a current flow through the heater The heater may be a positive temperature coefficient (PTC) heating element that significantly increases in resistance once a particular temperature is reached. A PTC heater inherently limits the magnitude of the steady state current that flows in response to a particular voltage applied to the heater. To improve actuator response time without excessive current flows, a resistance heater may be connected in series with a PTC heating element.

In all of the thermal actuators described in the cited patents, a sliding piston extends and retracts a pin in response to an electrical signal applied to the heater. In many applications, it is desirable to provide a rotary motion rather than the linear motion produced by the known actuators.

SUMMARY OF THE INVENTION

Accordingly, it is a primary object of the invention to provide an electrothermal actuator that produces a rotary motion of a mechanical element in response to an electrical signal.

Another object of the present invention is to provide an electrothermal actuator that is small in size, uses few parts, and is low in cost for providing a rotary mechanical output in response to an electrical input.

According to the present invention, a rotary electrothermal actuator includes a housing, a flexible diaphragm disposed within the housing and defining a boiler chamber, a working fluid disposed within the boiler chamber, a heater disposed within the boiler chamber for heating the working fluid in response to a current flow through the heater, a rotating shaft assembly disposed partially within and partially outside the housing and including a rotating shaft extending outwardly from the housing rotating between a return position and a rotated position, and means for rotating the shaft from the return position to a rotated position in response to heating of the working fluid that displaces the diaphragm.

In one embodiment, the rotating shaft assembly and the means for rotating includes a threaded lead screw attached to the rotating shaft and disposed within the housing and a piston nut including threads complementary to and engaging the lead screw threads. The piston nut is prevented from rotating within the housing and is in contact with the diaphragm. Sliding displacement of the piston nut by the diaphragm causes rotation of the lead screw that threadedly engages the piston nut, thereby rotating the shaft.

In another embodiment, the rotating shaft assembly and means for rotating include a cam driver and cam disposed within the housing including opposing faces having variable depth recesses and a spherical member contacting and disposed within the opposed recesses in the cam driver and cam. The cam driver is prevented from rotating within the housing and is in contact with the diaphragm. Sliding displacement of the cam driver causes rotation of the cam to which the shaft is attached through a rolling action of the spherical members within the variable depth recesses.

Other objects and advantages of the present invention will become apparent from the detailed description given hereinafter. It should be understood, however, that the detailed description and specific embodiments are given by way of illustration only, since various changes and modifications within the spirit and scope of the invention will become apparent from the detailed description.

BRIEF DESCRIPTION OF THE DRAWINGS

FIG. 1 is a side view of an embodiment of a rotary electrothermal actuator according to the invention.

FIGS. 2(a) and 2(b) are a sectional side view and a front end view of an embodiment of a rotary electrothermal actuator according to the invention with the shaft in the return position.

FIGS. 3(a) and 3(b) are a sectional side view and a front end view of an embodiment of a rotary electrothermal actuator according to the invention with the shaft in the rotated position.

FIG. 4 is a rear end view of an embodiment of an electrothermal actuator according to the invention.

FIGS. 7(a) and 7(b) are frontal views of alternative cam driver and cam faces that may be employed in embodiments of the invention.

DESCRIPTION OF PREFERRED EMBODIMENTS

Figure 5B:
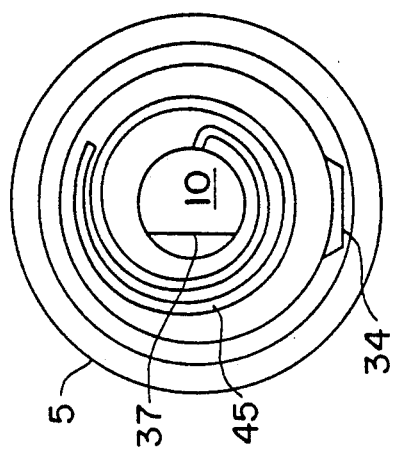
FIGS. 5(a) and 5(b) are a sectional side view and a shaft end view of an alternative embodiment of a rotary electrothermal actuator according to the invention with the shaft in the return position.

In FIG. 1, a side view of a rotary electrothermal actuator 1 according to one embodiment of the invention is shown. The actuator 1 includes a housing 2, preferably metal, including a rear housing 3 and front housing 4 that are joined together by a crimp seal at a collar 5. Two electrical leads 6 and 7 protrude from the rear housing 3 for supplying an electrical current to actuate the actuator 1, i.e., to rotate a shaft 10 that protrudes from the front housing 4. The electrical leads 6 and 7 are seen more clearly in FIG. 4, a view from the rear end of the actuator. Front views of the actuator in normal and actuated positions, respectively, are shown in FIGS. 2(b) and 3(b), respectively. FIGS. 2(a) and 3(a) are sectional views with the internal elements of the actuator in positions respectively corresponding to the front views of FIGS. 2(b) and 3(b).

In FIG. 2(a), the rear housing 3 encloses a boiler chamber 20 containing a working fluid that is liquid at the normal ambient temperature but changes to a gaseous phase upon heating. A heater 21, which may be a resistance heater or a PTC heater, is housed within the boiler chamber 20 and includes leads 22 and 23 respectively connected to electrical leads 6 and 7 after passing through a plastic, resinous, ceramic, glass or other electrically insulating feedthrough 24 that closes the rear end of the rear housing 3. At the front end of the boiler chamber 20, a flexible elastic diaphragm 25 defines the front wall of the boiler chamber 20. The diaphragm 25 is held in place at its periphery in the collar 5 where the rear housing 3 is crimped to the front housing 4. The diaphragm is a flexible material, such as an elastomer, that is displaced when the pressure within the boiler chamber 20 increases.

The boiler chamber may also be defined by an optional liner 26 that insulates the rear housing 3 from electrical contact with the heater 21. The liner 26 may be a high temperature plastic or a resinous material that can insulate the metal housing.

The front housing 4 encloses a rear part 30 of a shaft assembly including the shaft 10 that extends out of the front housing 4. The shaft assembly includes a lead screw 30 that is disposed within the front housing 4 and on which external threads are formed. The shaft 10 and lead screw 30 are preferably unitary. Those threads on lead screw 30 engage complementary internal threads on a piston nut 31 disposed within the front housing 4. At least one of the lead screw 30 and the piston nut 31 is made of a material, such as a fluorocarbon resin, that has a low coefficient of friction so that the lead screw 30 can easily rotate within and relative to the piston nut 31. The shaft assembly includes a helical spring 32 disposed partially within a recess within the lead screw 30. The ends of the helical spring 32 are attached to the shaft 10 and the piston nut 31, respectively.

The piston nut 31 includes an external shoulder 33 that engages a protruding guide 34 in the front housing 4. The shoulder and guide prevent rotation of the piston nut 31 relative to the housing 2 but do not prevent linear motion of the piston nut 3 within the front housing 4. Where the lead screw 30 and the shaft 10 unite, within and adjacent to the front housing 4, the shaft assembly includes a shoulder 35 that bears on the inside surface of the front section 4 of the housing. A washer 36 of a material having a low coefficient of friction, such as a fluorocarbon resin, is preferably interposed between shoulder 35 and the inside surface of the front housing 4 to reduce friction as the shaft 10 rotates. The portion of the shaft 10 protruding from the front housing 4 has a generally circular cross-section but includes two parallel planar surfaces 37 and 38 for engaging another object and rotating the object when the shaft 10 rotates. Planar surfaces 37 and 38 are only one embodiment of an engagement means that provides positive transmission of a rotary mechanical force when the shaft 10 rotates and many alternative arrangements, including a key and groove, gear teeth, planar surfaces forming a square or hexagon in cross-section, and the like may also be used, as readily apparent to a person of skill in the art.

When an appropriate electrical current flows through leads 6 and 7, the heater 21 warms the working fluid within the boiler chamber 20, causing that fluid to expand and become a gas. The resulting increased pressure urges diaphragm 25 toward the front housing 4. In response to that force, the piston nut 31 is urged toward the front housing 4, restrained by frictional forces and the force applied by the spring 32. When those resisting forces are overcome, the piston nut 31 slides linearly toward the front housing 4 because it is prevented from rotating by the shoulder 33 and the guide 34 of the front housing 4. The sliding causes rotation of the lead screw 30 within the piston nut 31 so that the shaft 10 is rotated, as indicated in FIGS. 3(a) and 3(b). In the illustrated embodiment, the rotated position of the lead screw 30 and the shaft 10 are shown as a ninety degree rotation from the return position. The angle of rotation in a particular embodiment of the invention depends upon the size of the actuator, the amount of displacement and/or expansion of the diaphragm 25, and the pitch of the complementary, engaging threads of the lead screw 30 and the piston nut 31. Rotations of less than or more than ninety degrees can easily be achieved.

As shown in FIG. 3(a), when the shaft 10 has been rotated, the spring 32 is compressed and applies both a linear and a torsional force, urging the shaft 10 toward the return position, i.e., the position shown in FIG. 2(a). However, as long as the pressure in the boiler chamber 20 is maintained so that the diaphragm 25 is displaced and/or distended, the position of the shaft 10 shown in FIG. 3(a) is maintained. When the working fluid in the boiler chamber 20 is allowed to cool, by reduction or removal of the electrical driving current applied to the leads 6 and 7, the pressure decreases, the force applied by the diaphragm 25 decreases, and the force applied by the spring 32 overcomes the force applied by the diaphragm 25. As the pressure declines, the shaft 10 counter-rotates to the return position shown in FIG. 2(a) from the rotated position shown in FIG. 3(a).

The embodiment of the invention shown in FIG. 2(a) includes the return spring 32 urging the shaft 10 toward the return position. When the shaft 10 is urged toward the return postion by the mechanical load applied to and actuated by the shaft 10, no return spring is needed.

The embodiment of the invention shown in FIG. 2(a) is merely illustrative of a rotating electrothermal actuator incorporating a non-rotating piston nut and a shaft assembly including a lead screw threadedly engaging a piston nut and a return spring for urging the rotating shaft to return from a rotated position to the return position. Non-helical return springs and return springs mounted on the outside of the housing of the actuator may be employed in the invention to produce the same result. The complementary guide 34 and shoulder 33 are only an example of a means for preventing rotation of the piston nut 31 relative to the front housing 4. Other arrangements of keys and grooves and other complementary elements that prevent rotation will be apparent to those of skill in the art. The external/internal threading of the lead screw 30 and the piston nut 31 may be reversed.

Figure 5A:
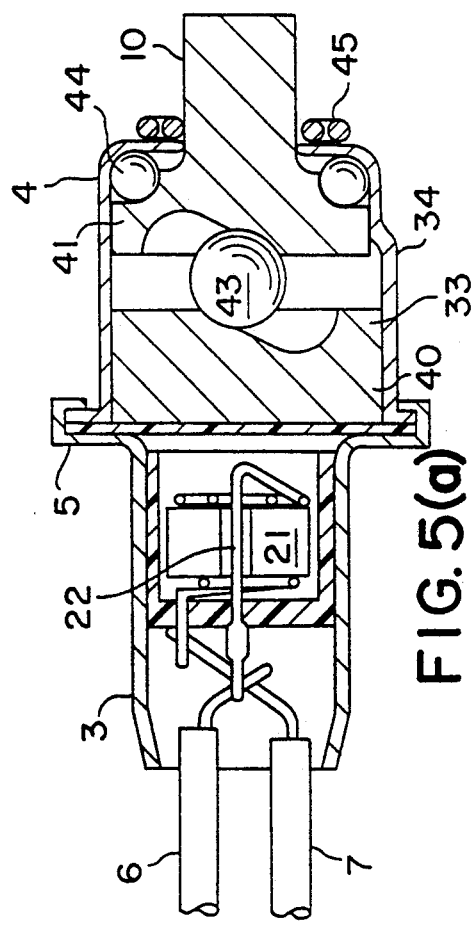

Another embodiment of the invention is shown in cross-sectional and front end views in FIGS. 5(a) and 5(b). Like elements in FIGS. 2(a) and 5(a) are given the same reference numbers and do not need additional explanation. The shaft assembly housed within the front housing 4 is significantly different in the embodiment shown in FIG. 5(a) compared to the embodiment shown in FIG. 2(a).

The shaft assembly within the front housing 4 of FIG. 5(a) includes a cam driver 40 on which the diaphragm 25 bears and a cam 41 from which the shaft 10 protrudes out of the front housing 4. The cam driver 40 and cam 41 are separated by and in contact with a plurality of spherical members 43, such as ball bearings, only one of which is shown in FIG. 5(a) for clarity. Cam driver 40 and cam 41 include, on their opposing faces, variable-depth recesses of the same sense, with regard to their depth gradients, that receive the spherical member 43 as described below in connection with FIGS. 6(a), 7(a), and 7(b). Ball bearings 44 are interposed between the inside of the front housing 4 and the shaft assembly, i.e., at the rear of the cam 41. A coil spring 45 is disposed on the outside of the front housing 4 with one end of the spring attached to the front housing 4 and the other end attached to the shaft 10 to apply a biasing force, urging the shaft 10 toward a return position. That return position is illustrated in FIGS. 5(a) and 5(b). As discussed above, the spring 45 is not needed when the load actuated by the shaft 10 urges the shaft toward the return position. The front housing 4 includes a guide 34 engaging the shoulder 33 on the cam driver 40 so that the cam driver 40 may slide linearly within the front housing 4 but may not rotate relative to the front housing. The shaft 10 includes a single planar surface 37 for engaging a complementary feature on a driven member engaged by the shaft.

Figure 6B:
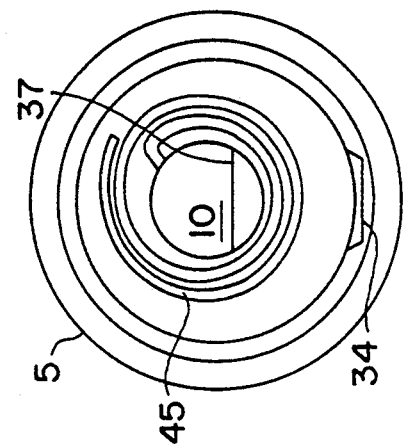
FIGS. 6(a) and 6(b) are a sectional side view and a shaft end view of an alternative embodiment of a rotary electrothermal actuator according to the invention with the shaft in the rotated position.
Figure 6A:
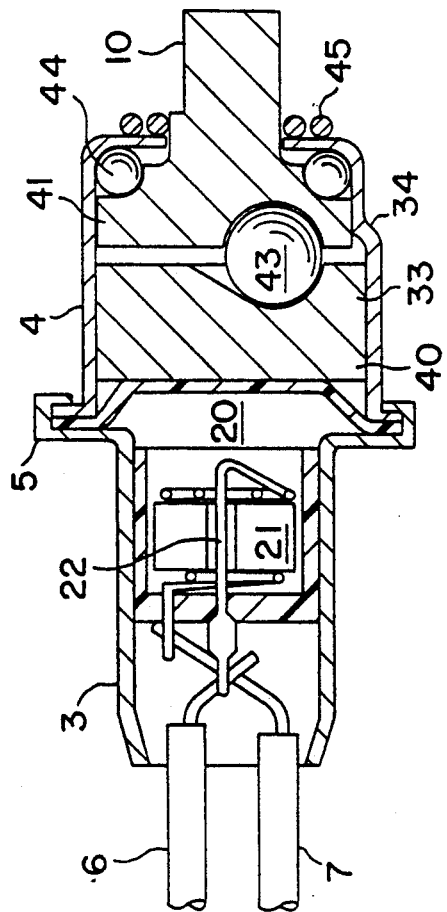

FIGS. 6(a) and 6(b) illustrate the positions of the elements within the actuator of FIG. 5(a) when the shaft 10 has fully rotated. In the embodiment illustrated, the shaft 10 rotates ninety degrees when an electrical current of sufficient magnitude flows through the heater so that the working fluid in the boiler chamber 20 becomes a gas, and the diaphragm 25 is fully distended. In order to understand the mechanism of turning the shaft, it is important to refer to FIG. 7(a) which illustrates one embodiment of a face 51 used in a cooperating cam driver 40 and cam 41. In the illustrated embodiment, each of these faces 51 includes three generally kidney-shaped recesses 53 generally lying along a circumference of a circle centered on the axis of rotation of the shaft 10 and cam 41. Each of the recesses has a depth that varies along the circumference of the circle. Generally, each of the recesses 53 on each of the faces 51 are identical. The widest section of each recess is also the deepest portion and the narrowest portion is the shallowest section.

When a force is applied to the cam driver 40 by the diaphragm 25 from increasing pressure in the boiler chamber, the cam driver 40 attempts to slide forward, i.e., toward the shaft 10, and is restrained from rotating relative to the housing 4 by the shoulder 33 and the guide 34. To relieve the force and allow the cam driver 40 to move forward, the cam 41 rotates so that the deepest portions of the opposed pairs of recesses of the cam driver 40 and cam 41, respectively, are disposed opposite each other, as shown in FIG. 6(a).

Initially, as shown in FIG. 5(a) in the return position, the shallower portions of those opposed recesses are opposite each other with the spherical member 43 positioned in the shallower portions of the recesses. In order to continue to accommodate that spherical member 43 and to relieve the pressure applied by the diaphragm 25 when the working fluid is in the gas phase, through a rolling movement of the spherical members, the shaft assembly rotates, bringing the spherical member 43 into the deepest portions of the opposed recesses 53, as shown in FIG. 6(a). As shown in FIG. 6(b), that rotation of cam 41 causes a ninety degree counterclockwise rotation of the shaft 10. The ball bearings 44 reduce the friction between the shaft assembly and the housing, facilitating the rotation of the shaft 10. The rotation of the shaft 10 increases the force applied to the shaft 10 by the spring 45 that attempts to restore the shaft 10 to the return position. When the force exerted by the diaphragm 25 is relieved by a reduction of pressure in the boiler chamber 20, the spring 45 restores the shaft 10 to the return position.

The recesses 53 of the face 51 illustrated in FIG. 7(a) result in a particular direction of rotation, e.g. clockwise, of the shaft 10. A counterclockwise rotation can be achieved if the sense, i.e. the direction of depth variation of the recesses, is reversed. For example, a face 51' including recesses 53' of the reverse sense are illustrated in FIG. 7(b). When recesses 53' are employed on the faces of cooperating cam drivers and cams, a direction of rotation opposite to that achieved with the faces 51 of FIG. 7(a) is produced.

The cooperating faces cam driver 40 and the cam 41 illustrated in FIGS. 7(a) and 7(b) are merely illustrative. A larger or smaller number of recesses can be included in each face of the cam and cam driver, although each of the faces preferably includes at least two recesses and two spherical members. A single recess on each of the cam driver and cam faces may be employed if a means, such as a protrusion from one of the faces, is provided to prevent binding between the housing and cam driver and/or cam during rotation or counter-rotation of the shaft. The recesses may be longer or shorter along the circumference of the circle depending upon the angle of rotation between the rotated position and the return position of the shaft. That angle of rotation may be greater or less than ninety degrees.

Figure 8:
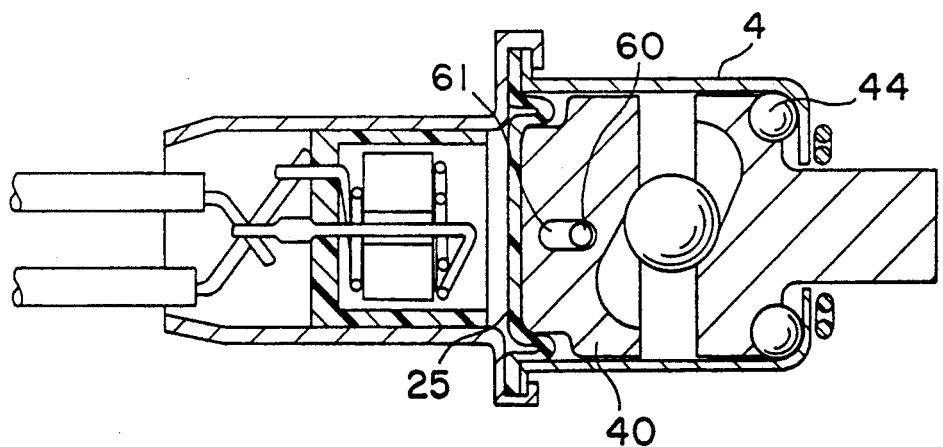
FIG. 8 is a sectional side view of still another embodiment of an electrothermal actuator according to the invention.

Yet another embodiment of the invention is shown schematically in FIG. 8 in a cross-sectional view. In that actuator, the guide for preventing rotation of the cam driver is a pin 60 attached to the cam driver that engages a slot in the front housing 4. In this embodiment, no protruding or asymmetrical guide is required on the front housing to engage a tongue on the cam driver. In addition, the cam driver includes a peripheral recess for receiving a folded or rolled annular peripheral portion of the diaphragm 25 which is not stretched taut as in the embodiment of FIG. 5(a). In FIG. 8, the diaphragm 25 is even larger, relative to the axial cross-sectional area of the actuator, than the diaphragm in the embodiment of the invention shown in FIG. 2(a). Unlike the relatively taut diaphragm of the embodiment of FIG. 5(a), in FIG. 8, the diaphragm 25 "rolls" as the cam driver 40 slides. Of course, any of the diaphragm arrangements can be used with any of the actuator embodiments of the invention described here. The embodiment of FIG. 8, like the embodiment of FIG. 5(a), includes spherical bearings 44 disposed between the cam and the housing for reducing the rotational friction of the shaft assembly in the housing. While two such ball bearings are illustrated in the cross-sectional view shown, a larger number of ball bearings can be employed Alternatively, the ball bearings 44 of the embodiment of FIG. 5(a) and the washer 36 of FIG. 2(a) can be interchanged or a different friction-reducing bearing can be employed.

I claim:

1. An electrothermal actuator for converting electrical energy to rotational mechanical motion comprising:
   a housing;
   a flexible diaphragm disposed in the housing and defining a boiler chamber within the housing;
   a working fluid disposed within the boiler chamber, changing phase in response to heating and thereby displacing the diaphragm;
   heating means disposed within the boiler chamber for heating the working fluid in response to an electrical current flowing through the heating means; and
   a rotatable shaft assembly partially disposed within the housing and including a rotatable shaft extending outside the housing and rotating between a return position and a rotated position, a cam driver slidingly disposed within the housing, a cam rotatably disposed within the housing and attached to the shaft, first and second recesses of variable depth respectively disposed in the cam driver and the cam, the respective recesses being disposed opposite each other, a spherical member disposed in the first and second recesses contacting the cam driver and the cam for rotating the cam about an axis in response to sliding of the cam driver, whereby the shaft and the cam rotate from the return position toward the rotated position in response to heating of the working fluid.

2. The actuator of claim 1 wherein the cam driver and the housing include means for preventing rotation of the cam driver relative to the housing.

3. The actuator of claim 2 wherein the means for preventing rotation comprises a guide on the housing and a shoulder on the cam driver engaging the guide.

4. The actuator of claim 2 wherein the means for preventing rotation comprises a slot in the housing and a pin mounted on the cam driver engaging the slot.

5. The actuator of claim 1 including a return spring engaging the shaft and urging the shaft to rotate toward a return position.

6. The actuator of claim 5 wherein the return spring is disposed outside the housing and engages the shaft and the housing.

7. The actuator of claim 1 wherein the first and second recesses have depths varying along a circle centered about the axis of rotation of the cam.

8. The actuator of claim 1 wherein the cam driver and cam each include a plurality of variable depth recesses disposed opposite each other and a spherical member disposed in a recess in each of the cam driver and the cam and contacting the cam driver and the cam.

9. The actuator of claim 8 wherein the recesses in the cam driver have depths varying along a circle centered about the axis of rotation of the cam in the same direction as the depth variations of the recesses in the cam along the circle.

10. The actuator of claim 1 including means for reducing friction disposed between and bearing on the housing and the cam.

11. The actuator of claim 10 wherein the means for reducing friction comprises a ball bearing.

12. An electrothermal actuator for converting electrical energy to rotational mechanical motion comprising:
    a housing;
    a flexible diaphragm disposed in the housing and defining a boiler chamber within the housing;
    a working fluid disposed within the boiler chamber, changing phase in response to heating and thereby displacing the diaphragm;
    heating means disposed within the boiler chamber for heating the working fluid in response to an electrical current flowing through the heating means; and
    a rotatable shaft assembly partially disposed within the housing and including a rotatable shaft extending outside the housing and rotating between a return position and a rotated position without translational movement of the shaft relative to the housing and a cam driver slidingly disposed within the housing, a cam rotatably disposed within the housing and attached to the shaft, first and second recesses of variable depth respectively disposed in the cam driver and the cam, the respective recesses being disposed opposite each other, a spherical member disposed in the first and second recesses contacting the cam driver and the cam for rotating the cam about an axis in response to sliding of the cam driver whereby displacement of the diaphragm slides the cam driver relative to the housing, thereby rotating the cam and shaft.

13. The actuator of claim 12 wherein the cam driver and the housing include means for preventing rotation of the cam driver relative to the housing.

14. The actuator of claim 13 wherein the means for preventing rotation comprises a guide on the housing and a shoulder on the cam driver engaging the guide.

15. The actuator of claim 13 wherein the means for preventing rotation comprises a slot in the housing and a pin mounted on the cam driver engaging the slot.

16. The actuator of claim 12 including a return spring engaging the shaft and urging the shaft to rotate toward a return position.

17. The actuator of claim 12 wherein the cam driver and cam each include a plurality of variable depth recesses disposed opposite each other and a spherical member disposed in a recess in each of the cam driver and the cam and contacting the cam driver and the cam.

* * * * *

UNITED STATES PATENT AND TRADEMARK OFFICE
CERTIFICATE OF CORRECTION

PATENT NO. : 5,203,171

DATED : April 20, 1993

INVENTOR(S) : Bradford W. Petot

It is certified that error appears in the above-identified patent and that said Letters Patent is hereby corrected as shown below:

On the title page,
Item no. [75], Inventors, "Douglas Herndon" should be omitted.

Signed and Sealed this

Tenth Day of January, 1995

*Attest:*

BRUCE LEHMAN

*Attesting Officer*  Commissioner of Patents and Trademarks